(12) United States Patent
Svendsen et al.

(10) Patent No.: US 7,959,887 B2
(45) Date of Patent: Jun. 14, 2011

(54) METHOD FOR MANUFACTURING A DIAMOND COMPOSITE

(75) Inventors: Lena Svendsen, Stockholm (SE); Jie Zheng, Solna (SE); Fredrik Meurling, Gavle (SE); Tomas Rostvall, Hagersten (SE)

(73) Assignee: Element Six Limited, Co. Clare (IE)

( * ) Notice: Subject to any disclaimer, the term of this patent is extended or adjusted under 35 U.S.C. 154(b) by 0 days.

(21) Appl. No.: 11/882,893

(22) Filed: Aug. 6, 2007
(Under 37 CFR 1.47)

(65) Prior Publication Data
US 2008/0199388 A1    Aug. 21, 2008

Related U.S. Application Data

(63) Continuation of application No. 11/633,633, filed on Dec. 5, 2006, now abandoned, which is a continuation of application No. 10/553,653, filed as application No. PCT/EP2004/050367 on Mar. 26, 2004, now abandoned.

(30) Foreign Application Priority Data

Apr. 4, 2003 (SE) .......................... 031117

(51) Int. Cl.
*C01B 31/36* (2006.01)
(52) U.S. Cl. ........ 423/345; 423/439; 423/446; 264/642; 264/643; 264/682; 51/307; 51/308; 51/293; 51/295; 51/296
(58) Field of Classification Search ................. 423/446, 423/345, 439; 51/293, 307, 309, 295, 298, 51/256; 264/328.1, 332, 642, 643, 682; 75/230, 75/236, 237, 243; 419/539.5, 564, 565; 501/88, 501/90; 257/E23.111, 77, E21.005, E21.041
See application file for complete search history.

(56) References Cited

U.S. PATENT DOCUMENTS

| 4,453,951 | A | * | 6/1984 | Ohno .............................. 51/307 |
|---|---|---|---|---|
| 5,032,147 | A | | 7/1991 | Frushour |
| 5,127,923 | A | | 7/1992 | Bunting et al. |
| 5,151,107 | A | | 9/1992 | Cho et al. |
| 5,435,815 | A | * | 7/1995 | Ikegaya et al. .................. 51/295 |
| 5,645,617 | A | | 7/1997 | Frushour |
| 5,649,984 | A | * | 7/1997 | Sigalas et al. ................... 51/293 |
| 6,063,333 | A | | 5/2000 | Dennis |
| 6,165,616 | A | | 12/2000 | Lemelson et al. |
| 6,179,886 | B1 | * | 1/2001 | Gordeev et al. ................. 51/293 |
| 6,447,852 | B1 | | 9/2002 | Gordeev et al. |
| 6,892,836 | B1 | | 5/2005 | Eyre et al. |

FOREIGN PATENT DOCUMENTS

| EP | 0 352 811 | 1/1990 |
|---|---|---|
| EP | 1 190 791 | 3/2002 |
| GB | 2 270 493 | 3/1994 |
| JP | 63-45189 | 2/1988 |
| JP | 6-9271 | 1/1994 |
| JP | 2001-515836 | 9/2001 |
| WO | WO 00/18702 | 4/2002 |
| WO | WO 02/42240 A2 | 5/2002 |

* cited by examiner

*Primary Examiner* — Jennifer K. Michener
*Assistant Examiner* — Heng M Chan
(74) *Attorney, Agent, or Firm* — Oblon, Spivak, McClelland, Maier & Neustadt, L.L.P.

(57) ABSTRACT

A method for manufacturing a diamond composite, includes: a) mixing diamonds with additives, the mixture comprising at least 50 wt % and less than 95 wt % of diamonds and more than 5 wt % additives; b) forming a work piece from the mixture using a pressure of at least 100 Mpa; c) heating the formed work piece to at least 300° C. for removing possible water and wholly or partially removing additives; d) heating the work piece and controlling the heating temperature and heating time so that a certain desired amount of graphite is created by graphitization of diamonds, wherein the amount of graphite created by graphitization is 3-50 wt % of the amount of diamond; e) infiltrating silicon or silicon alloy into the work piece.

15 Claims, No Drawings

METHOD FOR MANUFACTURING A DIAMOND COMPOSITE

CROSS REFERENCE TO RELATED APPLICATIONS

This application is a continuation of application Ser. No. 11/633,633 filed on Dec. 5, 2006; which is a continuation of application Ser. No. 10/553,653 filed on Oct. 14, 2005; which is the 35 USC 371 national stage of international application PCT/EP2004/050367 filed on Mar. 26, 2004, which designated the United States of America, and claimed priority to Swedish application 0301117-8 filed on Apr. 14, 2003. The content of each of the above-mentioned applications is hereby expressly incorporated by reference.

FIELD OF INVENTION

The present invention relates to a method for manufacturing a diamond composite.

BACKGROUND OF THE INVENTION

There is a general need for extremely hard materials in many fields of application. These applications may be as tools for cutting, turning, milling, drilling, sawing or grinding operations etc. In WO 99/12866 and WO 00/18702 methods using controlled graphitization of diamonds are known for manufacturing diamond composite materials having excellent properties for such applications. There is also a need for a material with extreme thermal conductivity to improve resistance to thermal chock, wear resistance and also for cooling electronic components like microprocessors. In WO 02/42240 the use of such method is known for manufacturing a composite material having a high thermal conductivity.

The object of the present invention is to improve such a method in such a way that the forming of the composite is facilitated, thereby enabling bodies having complex and very precise forms to be manufactured. The object of the invention is also a material produced by the method with improved performance.

SUMMARY OF THE INVENTION

The object of the invention is accomplished by a method for manufacturing a diamond composite, comprising the steps of;
a) mixing diamonds with additives, the mixture comprising at least 50 wt % and less than 95 wt % of diamonds and more than 5 wt % additives,
b) forming a work piece from the mixture using a pressure of at least 100 MPa,
c) heating the formed work piece to at least 300° C. for removing possible water and wholly or partially removing additives,
d) heating the work piece and controlling the heating temperature and heating time so that a certain desired amount of graphite is created by graphitization of diamonds, wherein the amount of graphite created by graphitization is 3-50 wt % of the amount of diamond,
e) infiltrating silicon or silicon alloy into the work piece, the infiltration of silicon or silicon alloy being, performed at a temperature below 1900° C. and at a pressure less than 50 bars, and
f) heating the infiltrated work piece to form silicon carbide, or other carbides (and silicides), thereby creating a final diamond composite.

In a preferred embodiment the additives in the mixture comprise binders and/or dispersing agents and/or low-friction agents. Advantageously, the mixture is agglomerated in order to facilitate forming of the work piece. The forming of the work piece is preferably made by mechanical pressing, injection moulding or roll compaction or other powder metallurgical forming processes. TiC, BC or SiC-powder can be included in the mixture. The forming of the work piece is made at a pressure of at least 100 MPa, preferably 300-700 MPa, most preferably about 600 MPa and the diamond content of the formed work piece is at least 40 vol %, preferably 70-80 vol %.

The heating of the formed work piece for removing water and additives is preferably made at a mechanical pressure of at least 500 Pa, preferably at least 3000 Pa. This pressure can typically be applied in one direction with a flat weight.

More silicon or silicon alloy than the amount needed for forming carbide from the created graphite and filling the pores of the formed carbide skeleton, can preferably be provided so that the surplus of silicon or silicon alloy will form a surface coating on at least one surface of the manufactured diamond composite.

The present invention also relates to the use of the inventive method for forming a substrate for a diamond film and to a diamond composite manufactured by the inventive method, wherein at least one side of the composite is coated with a layer of aluminium nitride.

DESCRIPTION OF EMBODIMENTS

The method according to the present invention aims to improve the methods presented in WO99/12866 and WO00/18702. These methods include the following steps:
1. Forming a work piece out of a mixture containing diamonds.
2. Heat treating the work piece and controlling the heating temperature and heating time so that a certain desired amount of graphite is created by graphitization of diamonds.
3. Infiltrating melted silicon or alternatively a silicon alloy into the heated work piece.
4. Reacting of the molten silicon or silicon alloy and graphite to form SiC. When silicon alloy reacts with graphite also other carbides and possibly silicides may form.

By the manufacturing process described above, an article with a predetermined shape is formed. In the present invention, steps similar to the steps 1-4 are used. The main difference from the known methods is the composition of starting materials and the use of high pressure during the forming step.

In a preferred embodiment, the starting material is comprised of diamonds and additives. The diamonds in the mixture preferably consist of at least two different fractions with different diamond particle sizes. To obtain high thermal conductivity at least 50 weight % of the diamond content in the work piece should preferably have a size of 80 μm or above. The use of at least two different fractions of diamonds with different particle sizes is advantageous in order to reach a packing degree in the work piece that in the produced diamond composite gives a high enough diamond concentration (e.g. a short path for the phonons to travel between the diamonds) to reach high levels of thermal diffusivity and thermal conductivity. High diamond content is normally also advantageous for wear resistance. The content of diamond in the work piece is at least 50 wt %, other contents being additives. In order to facilitate forming of the work piece and obtain improved mechanical properties in the final diamond composite in relation to a material manufactured in accordance with the known methods referred to above, the content of additives in the starting material mixture according to the present invention is more than 5 wt %. The additives in the mixture can comprise one or more of binders, dispersing agents, and low-friction agents commonly used in powder metallurgy and also other additives, like TiC, for facilitating the forming of the work piece, facilitating the infiltration of silicon or silicon alloy in the formed work piece and improving the properties of the final composite. The mixture can be made homogeneous in a liquid with the help of dispersing agents. In order to further facilitate forming of the mixture, the mixture is advantageously agglomerated in a liquid, like water or alcohol.

Example of a suitable binder is polyethyleneglycol (PEG). Examples of suitable dispersing agents are ammonium salt of polycarboxylate and steric acid is a suitable low-friction agent. Other known binders, dispersing agents and low-friction agents can also be used.

Examples of further additives that can be used are TiC, BC and SiC.

Forming of the work piece is carried out by mechanical pressing, injection moulding, roll compaction or other known powder metallurgical forming methods. The forming should be performed at a forming pressure of at least 100 MPa. Advantageously a pressure of at least 300 MPa-700 MPa is used. The amount of additives in the mixture should be more than 5 wt %. One reason for this is to facilitate the distribution of the agglomerated mixture and to obtain a homogenous body while using high forming pressures. Especially low-friction agents help the redistribution of the components of the mixture under high pressure. Also the binder component should be chosen to limit the internal friction during the redistribution. The function of the binder is otherwise to keep the accurate shape of the work piece during handling and first stages of heating. A work piece formed in such a way will have a very precise form. Furthermore, the high forming pressure increases the packing degree of the diamonds thereby increasing the diamond content per volume and thereby the thermal conductivity and hardness of the produced diamond composite. After the forming step the diamond content in the work piece is at least 40 vol %, preferably 70-80 vol %. At high pressures the diamonds will be more and more crushed and pressures much higher than 700 MPa should normally not be used. The most preferred forming pressure is 600 MPa. Another advantage of using high forming pressures is that the deformation of the produced diamond composite will be less than with the known methods referred to above, although the deformation in diamond composites produced by these method is low and can be tolerated if not composite specimens with a very precise form are required. It has been shown that the deformations of a composite material specimens produced by the known methods referred to above are at least twice as high as the deformations of a composite material produced according to the present invention. Such deformations include warpage, swelling and shrinking.

After forming the work piece, the work piece is slowly heated to at least 300° C. Water and additives that are volatile or form gaseous compounds at the chosen temperature are thereby removed from the formed work piece. In order to minimize deformation of the work piece, a mechanical pressure of at least 500 Pa, preferably at least 3000 Pa, is optionally applied to the work piece during at least a part of this heating step. Typically this force is applied from one direction with a very flat weight to enhance the flatness of simple or complicated plates.

Thereafter the work piece is heated at a temperature between 1000-1900° C. The total duration of the heat treatment of the work piece is as long as is needed for creating the desired degree of graphitization of the diamonds. The amount of graphite created by graphitization of diamonds should be 3-50 wt % of the amount of diamonds. The heat treatment is made in vacuum or an inert atmosphere and at an atmospheric pressure less than 50 bars. For the properties of the final material it is crucial to obtain graphite created by graphitization of diamonds. Some residual carbon from incompletely removed additives may contribute as a carbon source.

The infiltration of molten Si or silicon alloy is carried out by such known methods as melting a solid piece on or near the surface of the work piece, feeding already molten Si or silicon alloy on to the surface of the work piece or by dipping the work piece into a melt of Si or silicon alloy. As the melt infiltrates the work piece it reacts with graphite and possibly residual carbon and forms SiC or a SiC phase including elements from the alloying elements. The formed phase and a small amount of un-reacted silicon or silicon alloy phase fill up the porous space of the work piece. When additives, such as TiC, BC or SiC, are included these can react with molten silicon or silicon alloy and form a phase or phases including at least one of the elements from the additives. Preferably, a surplus of silicon or silicon alloy is used so that at least one surface of the diamond composite produced is coated with a layer of silicon or silicon alloy.

The heating and the infiltration steps can advantageously be carried out in the same furnace and it is possible to perform the heating steps in one heating cycle. It is of course also possible to perform the heating steps as separate heating operations, for example let the heated work piece cool before reheating the work piece together with silicon or silicon alloy.

The infiltrating melt used can be a silicon alloy comprising at least one metal from the group consisting of Ti, Zr, Hf; V, Nb, Ta, Cr, Mo, W, Mn, Re, Fe, Co, Ni, Cu, Ag, Al, and the elements B or Ge. In this case small amounts of secondary phase compounds may form, such as metal silicides, metal carbides, etc.

The sintered composite material thus consists of three major phases, a diamond phase, a carbide phase around each diamond and un-reacted silicon or silicon alloy phase between areas of carbide. The carbide that has formed from the reaction between the graphitized diamond and the melt is coating and surrounding each individual diamond particle. The carbide phase forms an interconnected skeleton structure, which is enclosing the diamond particles. There is very little diamond-diamond contact in the composite material. Due to the fact that the carbide has a thermal expansion coefficient larger than the thermal expansion coefficient of diamond, the carbide strives to contract more than the diamonds during cooling after the termination of the heat treatment. At temperatures below the temperature at which the carbide was formed, the carbide surrounding the individual diamond particles will exert a compressive force on each particle. This is believed to contribute to some extent to the surprisingly good thermal conductivity of the material according to the invention. The un-reacted silicon- or silicon alloy together with the possible small amounts of secondary phase compounds, such as metal carbides, metal suicides, etc, are mainly located in the areas in-between the silicon carbide that enclose the diamonds.

To provide a high value of thermal conductivity to a composite material it is crucial to have good adhesion between the different phases, see Handbook of industrial diamonds and diamond films, page 184. The graphite layer formed on the surface of the diamond particles has very good adhesion to the diamond since the graphite is transformed diamond. When the silicon or silicon alloy melt reacts with the said graphite the carbide formed inherits the very good adhesion to the diamond and a strong bond between the carbide and diamond is formed. When nucleation of carbide takes place on a graphite surface that has been formed trough graphitization of diamond the formed carbide grows epitaxially, i.e. the growth of carbide on the diamond follows the crystallographic orientation of the diamond. The manner in which carbide is formed and the strong bond between the diamond particles and the surrounding carbide are believed to be decisive factors for obtaining the surprisingly high thermal conductivity of a material according to the present invention. A long free path for the phonon transport is obtained in the material according to the present invention. The good bond between the diamonds and the carbide phase also has very good strength. If the produced composite is broken, the breakage often goes through the diamonds instead of breaking this bond, this showing the strength of the bond. In order to ensure that each diamond is surrounded by graphite and that a continuous carbide skeleton is obtained, the graphitization of diamond should always be more than 3 wt %, preferably more than 6 wt % of the diamond.

The graphitization transforms defective layers on the diamond surface, resulting in improvement of the phonon transport path. Surprisingly it has been found that a direct bonding between diamonds is not needed to achieve good thermal conductivity. To have a phonon transport path of high quality is more essential.

It has surprisingly been found that the high pressure used during the forming step, does not hinder the infiltration of silicon or silicon alloy. It has been shown that silicon can be infiltrated into work pieces having porosity well below the lower limit of 25 vol % stated in WO99/12866 and WO00/18702. The present successful method has been achieved using a mixture of diamonds with at least one fraction containing diamonds larger than 0.080 mm. It has been observed that molten silicon is sucked into the work piece. It is believed that this phenomena is due to the size of the larger pores in the powder mixture of diamonds and additives being heavily reduced by the forming made at a high pressure, so that a large percentage of the pores have a capillary size after the forming and the graphitization steps. Such a reduction of the pore volume needed for the infiltration, makes it possible to produce diamond composites having a very high content of diamond and a low content of un-reacted silicon or silicon alloy.

Surprisingly, it has also been observed that powders of TiC in the mixture further facilitates the infiltration of silicon. It has also been shown that TiC improves the mechanical properties of the composite. Good results have also been accomplished with BC and SiC.

It has been shown that a diamond composite made by this method is an excellent substrate for a pure diamond layer, made by e.g. Chemical Vapour Deposition, CVD. The high thermal conductivity and the low thermal expansion make a good match with pure diamond layer, both in the CVD process and in electronic applications and wear applications.

A diamond composite manufactured by the described method can be coated with a thin layer of aluminium nitride. With one side coated with a 0.001 mm layer of aluminium nitride on diamond composite made in accordance to the present invention, the electrical resistance has be shown to increase 100 times or more. This is important in certain designs of microprocessor packages.

The invention claimed is:

1. A method for manufacturing a diamond composite, comprising
   a) mixing diamonds with additives, the mixture comprising at least 50 wt % and less than 95 wt % of diamonds and more than 5 wt % additives,
   b) forming a work piece from the mixture using a pressure of 300 to 700 MPa,
   c) heating the formed work piece to at least 300° C. for removing possible water and wholly or partially removing additives,
   d) heating the work piece and controlling the heating temperature and heating time so that a certain desired amount of graphite is created by graphitization of diamonds, wherein the amount of graphite created by graphitization is 3-50 wt % of the amount of diamond,
   e) infiltrating silicon or silicon alloy into the work piece, the infiltration of silicon or silicon alloy being performed at a temperature below 1900° C. and a pressure less than 50 bars, and
   f) heating the infiltrated work piece to form silicon carbide, or other carbides thereby creating a final diamond composite.

2. The method according to claim 1, wherein the additives in the mixture comprise binders and/or dispersing agents and/or low-friction agents.

3. The method according to claim 1, wherein the mixture is agglomerated in order to facilitate forming of the work piece.

4. The method according to claim 1, wherein the forming of the work piece is made by mechanical pressing, injection moulding or roll compaction.

5. The method according to claim 1, wherein particles of TiC, BC or SiC are included in the mixture.

6. The method according to claim 1, wherein the diamond content of the formed work piece is at least 40 vol %.

7. The method according to claim 1, wherein the removing of water and additives by heating the formed work piece is made at a mechanical pressure of at least 500 Pa.

8. The method according to claim 1, wherein more silicon or silicon alloy than the amount needed for forming carbide from the created graphite and filling the pores of the formed carbide skeleton, is provided so that the surplus of silicon or silicon alloy will form a surface coating of at least one surface of the manufactured diamond composite.

9. A method according to claim 1, wherein the diamond composite is formed as a substrate for a diamond film.

10. A diamond composite manufactured by the method according to claim 1, wherein one side of the composite is coated with a thin layer of aluminium nitride.

11. The method according to claim 1, wherein the diamond content of the formed work piece is 70-80 vol %.

12. The method according to claim 1, wherein the removing of water and additives by heating the formed work piece is made at a mechanical pressure of at least 3000 Pa.

13. The method according to claim 1, wherein the mixture of diamonds and additives further comprises at least 50 weight % of the diamonds have a size of at least 80 microns.

14. The method according to claim 1, wherein the mixture of diamonds with additives further comprises TiC, BC or Si—C powder.

15. The method according to claim 1, wherein the infiltrating step comprises infiltrating a melted silicon alloy comprising at least one element selected from the group consisting of Ti, Zr, Hf, V, Nb, Ta, Cr, Mo, W, Mn, Re, Fe, Co, Ni, Cu, Ag, Al, B and Ge.

* * * * *

UNITED STATES PATENT AND TRADEMARK OFFICE
CERTIFICATE OF CORRECTION

PATENT NO. : 7,959,887 B2
APPLICATION NO. : 11/882893
DATED : June 14, 2011
INVENTOR(S) : Lena Svendsen et al.

Page 1 of 1

It is certified that error appears in the above-identified patent and that said Letters Patent is hereby corrected as shown below:

On the title page, Item (30), the Foreign Application Priority Data is incorrect. Item (30) should read:

-- (30) Foreign Application Priority Data

Apr. 14, 2003   (SE) ....................................... 0301117-8 --

Signed and Sealed this
Thirtieth Day of August, 2011

David J. Kappos
*Director of the United States Patent and Trademark Office*